US012593374B2

(12) United States Patent　　　(10) Patent No.:　US 12,593,374 B2
Muhammad et al.　　　　　　　　　(45) Date of Patent:　　Mar. 31, 2026

(54) RECORDING OF PRIORITY COMMUNICATION RELATED INFORMATION

(71) Applicant: RAKUTEN MOBILE, INC., Tokyo (JP)

(72) Inventors: Awn Muhammad, Tokyo (JP); Kenichiro Aoyagi, Tokyo (JP); Tsunehiko Chiba, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 387 days.

(21) Appl. No.: 17/759,622

(22) PCT Filed: Jun. 22, 2021

(86) PCT No.: PCT/JP2021/023559
§ 371 (c)(1),
(2) Date: Jul. 28, 2022

(87) PCT Pub. No.: WO2022/208916
PCT Pub. Date: Oct. 6, 2022

(65) Prior Publication Data
US 2024/0188187 A1　　Jun. 6, 2024

(30) Foreign Application Priority Data
Mar. 31, 2021　(JP) ................................. 2021-059615

(51) Int. Cl.
*H04W 76/50*　　　(2018.01)
*H04W 4/90*　　　(2018.01)
(52) U.S. Cl.
CPC ............. *H04W 76/50* (2018.02); *H04W 4/90* (2018.02)

(58) Field of Classification Search
CPC ..................................................... H04W 76/50
See application file for complete search history.

(56) References Cited

U.S. PATENT DOCUMENTS 10,600,153 B2 * 3/2020 Roimela ........ H04N 21/234363
2009/0063174 A1 * 3/2009 Fricke ................... G06Q 40/08
705/4

(Continued)

FOREIGN PATENT DOCUMENTS

EP　　　3278581 B1　　12/2019
EP　　　3634041 A1　　4/2020

(Continued)

OTHER PUBLICATIONS

Office Action in JP Application No. 2023-510178, mailed Aug. 6, 2024, 5pp.

(Continued)

*Primary Examiner* — Barry W Taylor
(74) *Attorney, Agent, or Firm* — HAUPTMAN HAM, LLP

(57)　　　　　　ABSTRACT
A wireless communication system includes: a priority communication detection unit that detects priority communication from a communication device that communicates wirelessly; a connection unit that connects the communicator for which the priority communication is detected by the priority communication detection unit to a roaming network that is different from the home network under contract; a recording unit that records priority communication related information regarding priority communication executed by the communication device in the roaming network; and the notification unit that notifies the home network of the priority communication related information recorded by the recording unit.

14 Claims, 4 Drawing Sheets

(56)         References Cited

U.S. PATENT DOCUMENTS

| 2010/0261486 | A1* | 10/2010 | Sheha | H04M 1/2746 |
| | | | | 455/457 |
| 2015/0111524 | A1* | 4/2015 | South | G08B 25/016 |
| | | | | 455/404.2 |
| 2015/0281929 | A1 | 10/2015 | Shih et al. | |
| 2016/0295386 | A1 | 10/2016 | Faccin et al. | |
| 2017/0019777 | A1* | 1/2017 | Cole, Jr | H04W 4/02 |
| 2018/0249477 | A1 | 8/2018 | Norita et al. | |
| 2020/0252781 | A1* | 8/2020 | Edge | H04W 40/20 |
| 2021/0153087 | A1* | 5/2021 | Lee | H04W 36/08 |
| 2022/0095212 | A1 | 3/2022 | Takeda et al. | |
| 2023/0284108 | A1* | 9/2023 | Abtin | H04W 48/04 |
| | | | | 370/331 |
| 2025/0166485 | A1* | 5/2025 | Vaitl | H04W 4/90 |

FOREIGN PATENT DOCUMENTS

| JP | 2003109160 | A | 4/2003 |
| JP | 2017017666 | A | 1/2017 |
| JP | 2020039056 | A | 3/2020 |
| WO | 2020145300 | A1 | 7/2020 |
| WO | 2020213816 | A1 | 10/2020 |

OTHER PUBLICATIONS

Extended European Search Report in EP Application No. 21935076.6 dated Feb. 17, 2025, 13pp.

* cited by examiner

RECORDING OF PRIORITY COMMUNICATION RELATED INFORMATION

RELATED APPLICATIONS

This application is a National Stage of PCT international application No. PCT/JP2021/023559 filed on Jun. 22, 2021, which claims priority to Japanese Application No. 2021-059615 filed on Mar. 31, 2021.

BACKGROUND OF THE INVENTION

1. Field of the Invention

The present disclosure relates to wireless communication technology.

2. Description of the Related Art

The number, types, and applications of wireless communication devices, represented by smartphones and Internet of Things (IoT) devices, continue to increase, and wireless communication standards continue to be expanded and improved. For example, the commercial service of the 5th generation mobile communication system known as "5G" started in 2018, and the standards are still being developed by the 3GPP (Third Generation Partnership Project).
Patent Literature 1: JP-T-2021-503199

SUMMARY OF THE INVENTION

When a communication device such as a smartphone is used to make an emergency call to an emergency call number, if there is a problem with communication through the wireless communication network to which it is subscribed (hereinafter referred to as the home network), it may roam to another wireless communication network (hereinafter referred to as the roaming network) to make an emergency call. By switching the communicator to a roaming network, emergency calls etc. can be made even when the home network is not available. However, since the emergency call is made outside the home network, the home network cannot obtain sufficient information about the emergency call.

The present disclosure was made in consideration of this situation, and its purpose is to provide a wireless communication system that can collect information about priority communication executed outside the wireless communication network under contract.

In order to solve the above problem, a wireless communication system in a certain form of the present disclosure comprises: a priority communication detection unit that detects priority communication from a communicator that communicates wirelessly; a connection unit that connects the communicator for which the priority communication is detected to a second wireless communication network that is different from a first wireless communication network with which the communicator is under contract; and a recording unit that records priority communication related information regarding priority communication executed by the communicator in the second wireless communication network.

According to this aspect, the recording unit can collect information related to priority communication executed in the second wireless communication network (roaming network) outside the first wireless communication network (home network) under contract.

Another aspect of the present disclosure is a wireless communication method. The method comprises: detecting priority communication from a communicator that communicates wirelessly; connecting the communicator for which the priority communication is detected to a second wireless communication network that is different from a first wireless communication network with which the communicator is under contract; and recording priority communication related information regarding priority communication executed by the communicator in the second wireless communication network.

In addition, any combination of the above components, and any conversion of the expression of the present disclosure among methods, devices, systems, recording media, computer programs, and the like, is also valid as a form of the present disclosure.

According to the present disclosure, information about priority communication executed outside the wireless communication network under contract can be collected.

DETAILED DESCRIPTION OF THE INVENTION

Figure 1:
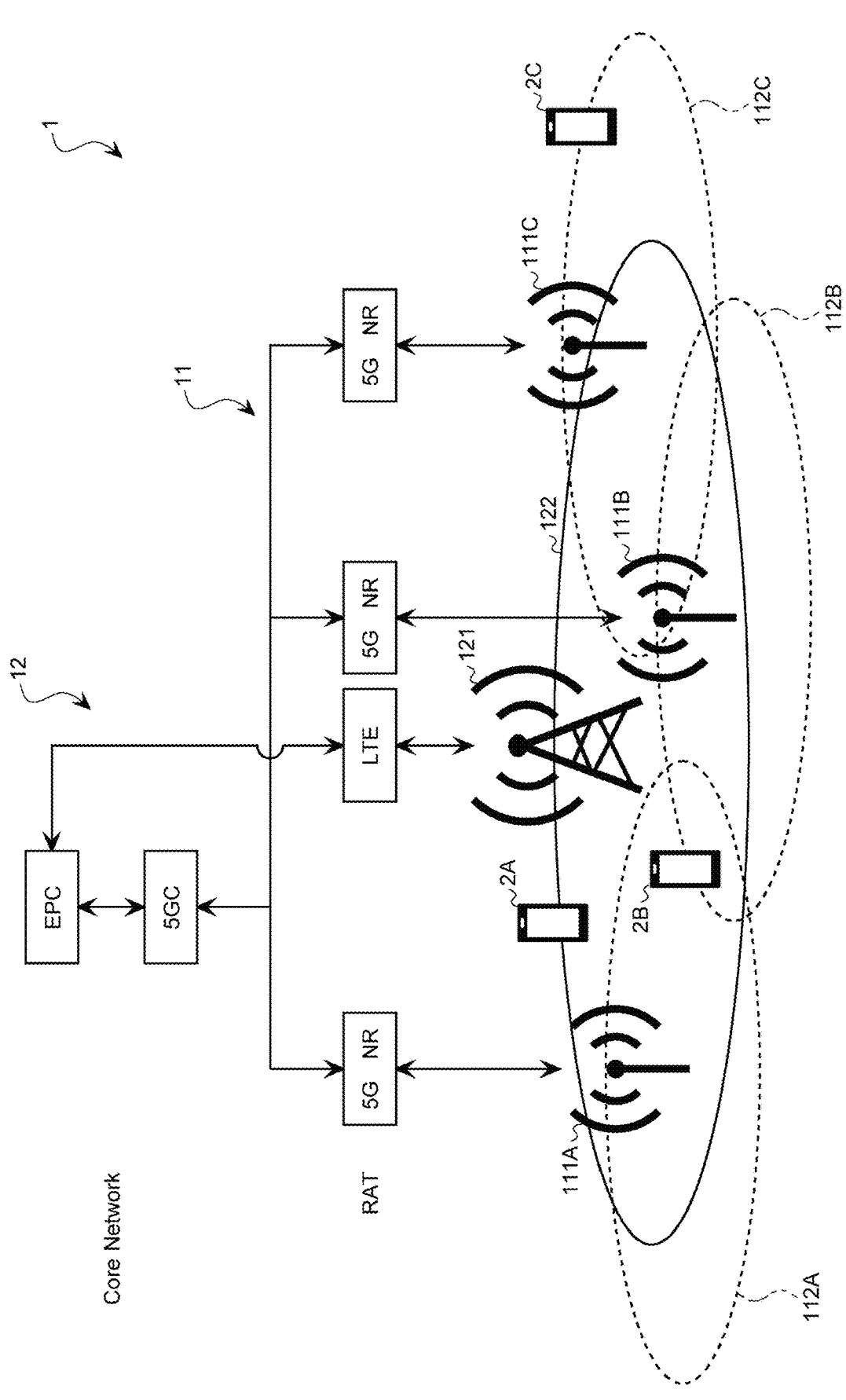
FIG. 1 is a schematic overview of the wireless communication network in the wireless communication system.

FIG. 1 schematically shows an overview of a wireless communication network 1 in a wireless communication system according to an embodiment of the present disclosure. The wireless communication network 1 is a home network for the communication devices 2 or communicators 2 that have a contract with the communication service of the operator, and a roaming network for the communication devices 2 that do not have a contract with the communication service of the operator but can roam thanks to an alliance between the operators. The wireless communication network 1 includes 5G wireless communication network 11 and 4G wireless communication network 12. 5G wireless communication network 11 that complies with the 5th generation mobile communication system (5G) uses NR (New Radio) or 5G NR (Fifth Generation New Radio) as the radio access technology (RAT) and 5GC (Fifth Generation Core) as the core network. 4G wireless communication network 12 that complies with the 4th generation mobile communication system (4G) uses LTE (Long Term Evolution) or LTE-Advanced as the radio access technology and EPC (Evolved Packet Core) as the core network. Although not shown in the figure, the wireless communication network 1 may include wireless communication networks of a generation prior to 4G, a generation later than 5G, or any wireless communication networks that are not associated with generations, such as Wi-Fi (registered trademark).

The 5G wireless communication network 11 may include 5G base stations 111A, 111B, and 111C (hereinafter collectively referred to as 5G base station 111) capable of communicating by 5G NR with communication devices or communicators 2A, 2B, and 2C (hereinafter referred to as communication device 2) such as smartphones, which are also referred to as UE (User Equipment). 5G base station 111 is also referred to as gNodeB (gNB). The coverage or support range of each 5G base station 111A, 111B, and 111C is referred to as a cell 112A, 112B, and 112C (hereinafter collectively referred to as cell 112).

The size of the cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For this reason, 5G tends to use more small cells than 4G and earlier generations.

In the example shown in the figure, communication device 2B in cells 112A and 112B can communicate with both 5G base stations 111A and 111B by 5G NR. In addition, the communication device 2C in the cell 112C can communicate with the 5G base station 111C by 5G NR. Communication device 2A is outside of all 5G cells 112A, 112B, and 112C, so it is not able to communicate by 5G NR. The 5G NR-based 5G communication between each communicator 2 and each 5G base station 111 is managed by the 5GC, which is the core network. For example, the 5GC transfers data to and from each 5G base station 111, transfers data to and from external networks such as the EPC and the Internet, and manages the movement of the communicator 2.

The 4G wireless communication network 12 comprises a plurality of 4G base stations 121 (only one of them is shown in FIG. 1) that can communicate with the communicator 2 by LTE or LTE-Advanced. The base station 121 in 4G is referred to as eNodeB (eNB). Similarly to each 5G base station 111, the communication range or support range of each 4G base station 121 is also called a cell and is shown as 122.

In the example shown in the figure, the communicators 2A and 2B in the cell 122 can communicate with the 4G base station 121 by LTE or LTE-Advanced. Communication device 2C is outside the cell 122 and is not able to communicate by LTE or LTE-Advanced. The 4G communication by LTE and LTE-Advanced between each communicator 2 and each 4G base station 121 is managed by the EPC, which is the core network. For example, the EPC manages the transfer of data to and from each 4G base station 121, the transfer of data to and from external networks such as 5GC and the Internet, and the movement management of the communicator 2.

The communication device 2 inside at least one of the plural cells 112A, 112B, 112C, and 122 of the wireless communication network 1 can communicate on the wireless communication network 1. Specifically, in the example shown in the figure, the communication device 2A inside cell 122 is in a state that enables 4G communication with 4G base station 121, and communication device 2B inside cells 112A, 112B, and 122 is in a state that enables 5G communication with 5G base stations 111A and 111B and 4G communication with 4G base station 121, and communication device 2C inside cell 112C is in a state that enables 5G communication with 5G base station 111C. When there are multiple base stations (111A, 111B, and 121) as in the case of communicator 2B, one base station is selected as the most suitable for the communicator 2B in terms of communication quality etc., under the control of the 5GC and/or EPC, which is the core network.

Figure 2:
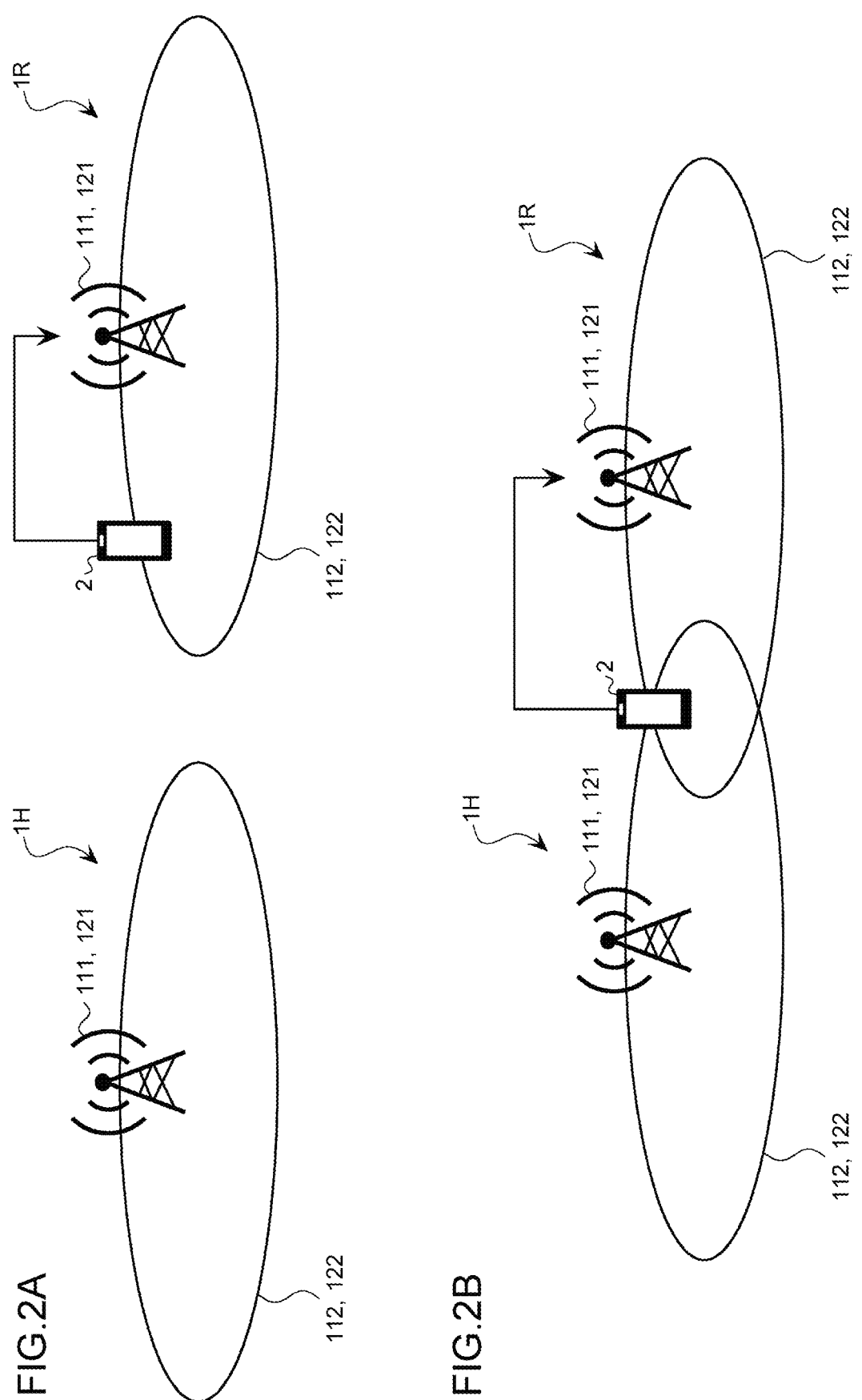
FIGS. 2A and 2B illustrate the roaming of a communication device.

FIGS. 2A and 2B illustrate the roaming of a communication device 2. The home network 1H is the first wireless communication network with which the communicator 2 has a communication service contract, and the roaming network 1R is the second wireless communication network with which the communicator 2 does not have a contract with the communication service but can roam thanks to an alliance between the operators. The home network 1H and the roaming network 1R are configured in the similar way to the wireless communication network 1 shown in FIG. 1, respectively. However, it is not necessary for each network 1H and 1R to include both 5G wireless communication network 11 and 4G wireless communication network 12 as illustrated in FIG. 1, but to include either one of them or any wireless communication network different from either of them.

In the example of FIG. 2A, the communicator 2 is outside the service coverage (cells 112 and 122) of the home network 1H, so it cannot communicate on the home network 1H. On the other hand, the communicator 2 is inside the service coverage area (cells 112 and 122) of the roaming network 1R, it can roam to roaming network 1R to communicate. In the example of FIG. 2B, the communication device 2 is inside the service area (cells 112 and 122) of both the home network 1H and the roaming network 1R. In this case, the communication device 2 communicates on the home network 1H in principle, but if communication on the home network 1H is impeded, or if high communication quality is required for priority communication as described later, the communication device 2 roams to the roaming network 1R, which has better communication quality than the home network 1H.

Figure 3:
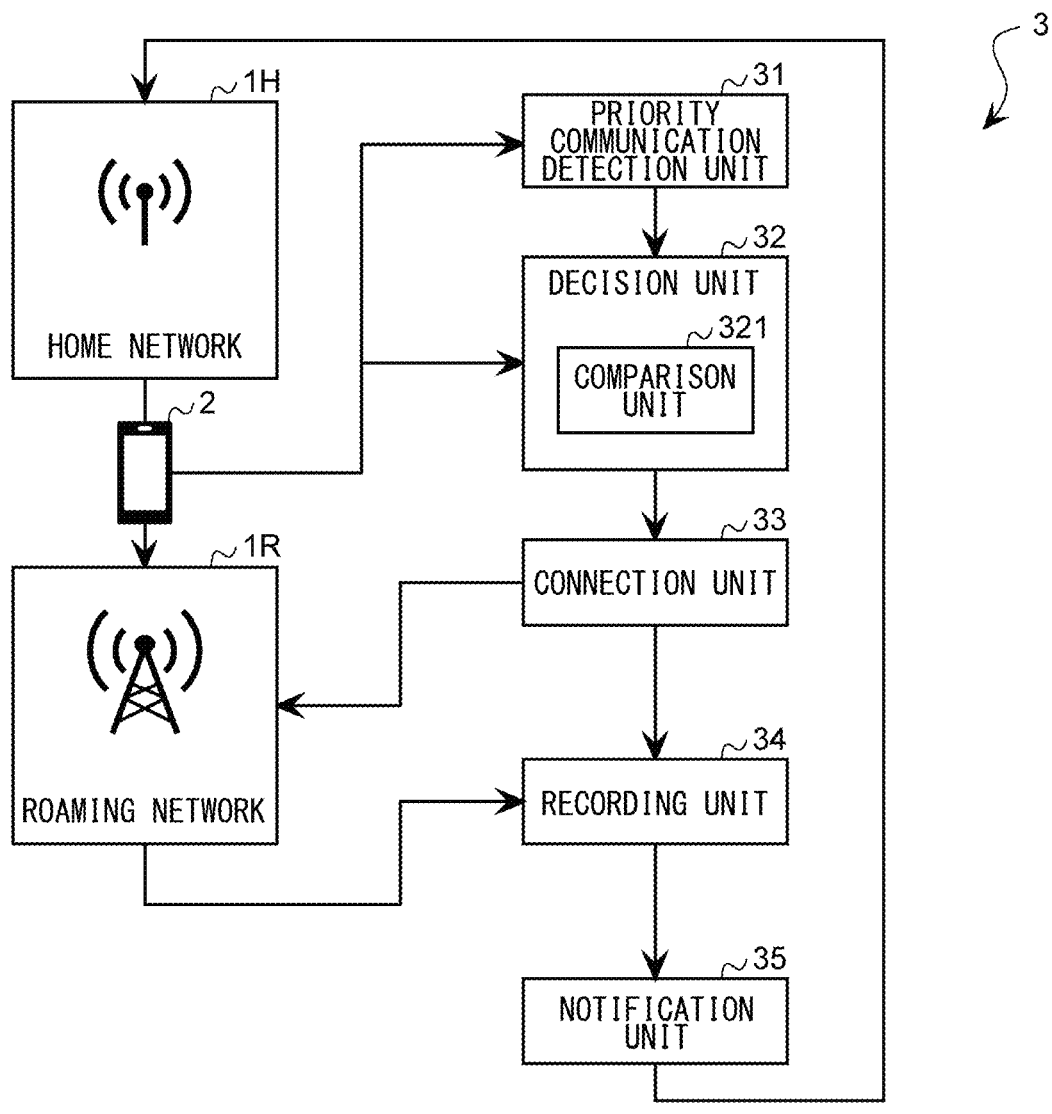
FIG. 3 is a functional block diagram of the priority communication processing apparatus implemented in the wireless communication system.

FIG. 3 shows a functional block diagram of the priority communication processing apparatus 3 implemented in the wireless communication system. The priority communication processing apparatus 3 has a priority communication detection unit 31, a decision unit 32, a connection unit 33, a recording unit 34 and a notification unit 35. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Specifically, some or all of each of the above functional blocks may be realized by hardware resources of at least one of: communication device 2; base station 111, 121 and/or core network in home network 1H; base station 111, 121 and/or core network in roaming network 1R; other components in the operation system of the wireless communication system; and any communication device that can communicate with the wireless communication system.

In FIG. 3, the communicator 2 is shown between the home network 1H and the roaming network 1R. However, as shown in FIG. 2A, the roaming device 2 may be outside the service coverage of the home network 1H. Conversely, as described below, when the communication device 2 connected to the home network 1H notifies the home network 1H by means of the notification unit 35, the communication device 2 may be outside the service range of the roaming network 1R.

The priority communication detection unit 31 detects priority communication from the communicator 2 that communicates wirelessly. The function of the priority communication detection unit 31 can be realized by the communication device 2. If the communication device 2 is connected to the home network 1H at the time when the priority communication is started, the priority communication detection unit 31 can be realized by the home network 1H. If the communication device 2 is connected to the roaming network 1R at the time when the priority communication is started, the priority communication detection unit 31 can be realized by the roaming network 1R.

Priority communications are communications or phone calls that are set or assigned a higher priority, importance, urgency etc. than normal communications, and include, for example, calls to emergency call numbers. In Japan, "110" is assigned for emergency calls to police agencies, "119" for emergency calls to fire departments, and "118" for emergency calls to the Japan Coast Guard. The emergency call by eCall, which is an emergency call system for car accidents in Europe, is also an example of priority communication. The communication unit in the car (that corresponds to the communication device 2 shown in the figure) makes an emergency report on the wireless communication network 1 about the occurrence of a car accident and its location. The emergency call by Emergency Services Fallback (ES-FB) and EPS Fallback (Evolved Packet System Fallback) specified in the 5th generation mobile communication system is also an example of priority communication.

The decision unit 32 determines whether or not priority communication can be executed in the home network 1H. If the communication device 2 is outside the service range of the home network 1H, as shown in FIG. 2A, the priority communication cannot be executed in the home network 1H. Therefore, the decision unit 32 determines that priority communication is not executed on the home network 1H. If the communication device 2 is inside the service range of the home network 1H as shown in FIG. 2B, the decision unit 32 determines whether or not to execute priority communication on the home network 1H based on the communication quality of the home network 1H.

Specifically, the comparison unit 321 provided in the decision unit 32 compares the communication quality of the roaming network 1R to which the communicator 2 can roam with that of the home network 1H. The criteria for comparing the communication quality are arbitrary, but for example, the communication quality of each wireless communication network can be evaluated based on signal strength, throughput, delay time, packet loss rate, packet error rate etc. If the communication quality of the roaming network 1R is judged by comparison unit 321 to be superior to that of the home network 1H, the decision unit 32 determines that priority communication is not executed on the home network 1H. On the contrary, if the comparison result that the communication quality of the home network 1H is better than that of the roaming network 1R is obtained by comparison unit 321, or if there is no roaming network 1R to which the communication device 2 can roam, the decision unit 32 determines that priority communication is executed on the home network 1H.

According to the decision by decision unit 32 that priority communication is not executed on the home network 1H, the connection unit 33 connects the communication device 2 for which the priority communication is detected by the priority communication detection unit 31 to the roaming network 1R that is different from the home network 1H under contract. As a result, the priority communication detected by the priority communication detection unit 31 is executed on the roaming network 1R.

The recording unit 34 records priority communication related information regarding priority communication executed by the communicator 2 on the roaming network 1R. The priority communication related information includes at least one of the following: the location of the communicator 2 during the priority communication; the time of the priority communication or other statistical information; the identification information of the roaming network 1R; and the identification information of the priority communication partner (another communicator with which the communicator 2 executes the priority communication). For example, the location of the communicator 2 during the priority communication can be computed by the communicator 2 based on the radio wave received from the GPS (Global Positioning System) satellite. The time of the priority communication is, for example, the start time of the priority communication, the end time of the priority communication, and the duration of the priority communication. The identification information of the roaming network 1R is, for example, a PLMN (Public Land Mobile Network) number. PLMN number is an identification number of the wireless communication network 1, and consists of a combination of MCC (Mobile Country Code), which represents a country or region, and MNC (Mobile Network Code), which represents an operator. The identification information of the priority communication partner is, for example, the IMEI (International Mobile Equipment Identifier) or terminal identification number of the priority communication partner, the IP (Internet Protocol) address of the priority communication partner, and the phone number of the priority communication partner.

The notification unit 35 notifies the home network 1H of the priority communication related information recorded by the recording unit 34. The recording unit 34 and the notification unit 35 are provided, for example, in the communication device 2, and the communication device 2 when reconnected to the home network 1H after the priority communication in the roaming network 1R shall notify the recorded priority communication related information to the home network 1H. The recording unit 34 and the notification unit 35 may be provided in the roaming network 1R, in which case the core network of the roaming network 1R notifies the recorded priority communication related information to the core network of the home network 1H via the Internet or other means.

Figure 4:
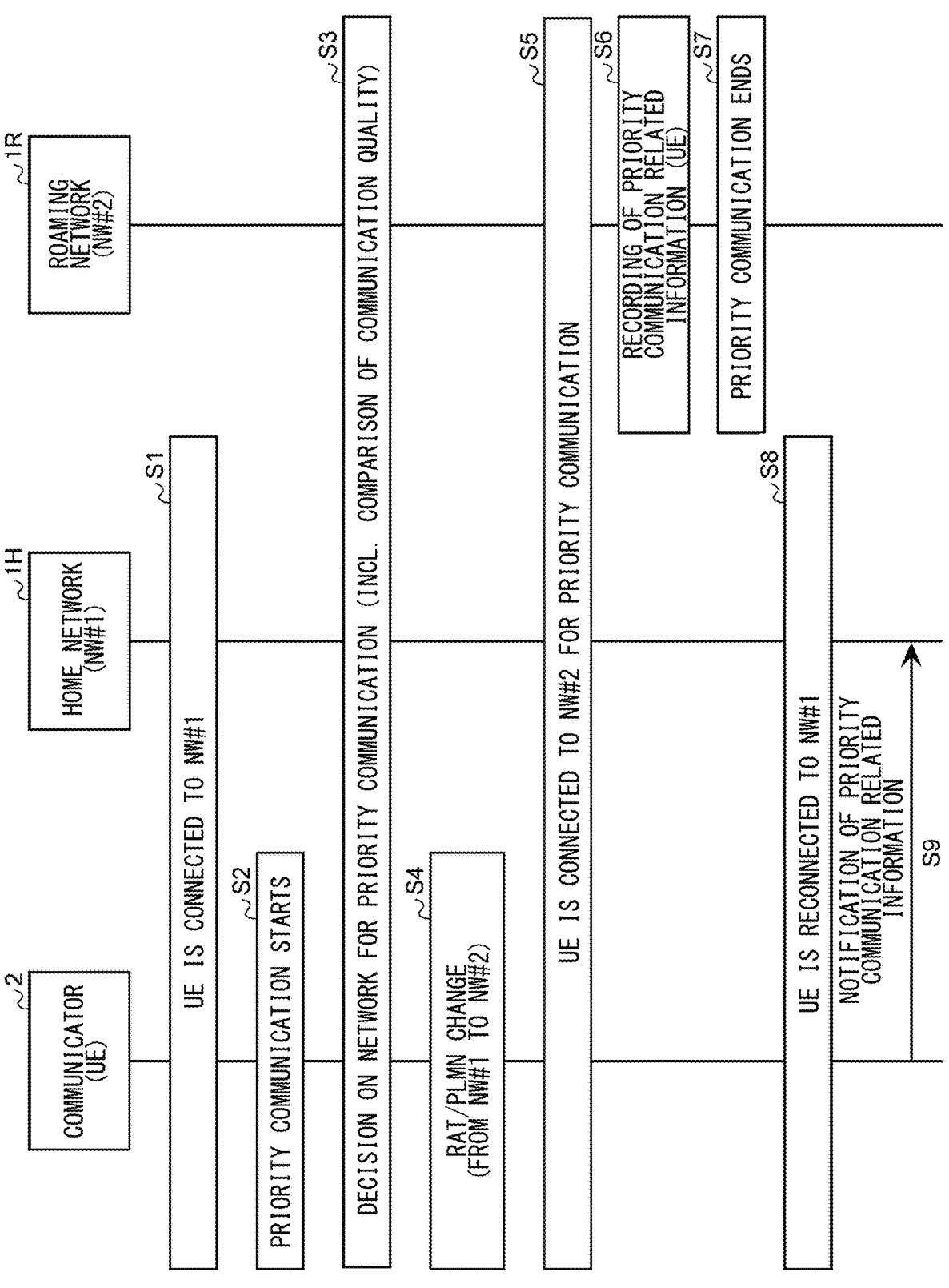
FIG. 4 illustrates the process of the priority communication processing apparatus.

FIG. 4 shows the example of process of the priority communication processing apparatus 3. In this example, the recording unit 34 and the notification unit 35 are provided in the communication device 2. In this figure, "S" means step or process. In S1, the communication device 2 (UE) is connected to the home network 1H (NW#1). In S2, the communication device 2 starts priority communication, and the priority communication detection unit 31 realized in the communication device 2 and/or the home network 1H detects the priority communication. In S3, the decision unit 32 determines the network in which the priority communication is to be executed. As described above, when the communication device 2 is outside the service range of the home network 1H (FIG. 2A) or when the communication quality of the roaming network 1R is better than that of the home network 1H (FIG. 2B), the decision unit 32 determines that priority communication is to be executed on the roaming network 1R. Conversely, if the communication quality of the home network 1H is better than that of the roaming network 1R, or if there is no roaming network available for the communicator 2, the decision unit 32 determines that priority communication is to be executed on the home network 1H. In the following example, the roaming network 1R is selected as the network to execute priority communication in S3.

In S4, the radio access technology (RAT) and the Public Land Mobile Network (PLMN) are switched from the home network 1H (NW#1) to the roaming network 1R (NW#2) to prepare for the connection of the communicator 2 to the roaming network 1R for the priority communication according to the decision in S3. For example, if the home network 1H is a 5G wireless communication network and the roaming network 1R is a 4G wireless communication network, the radio access technology is changed from NR or 5G NR in 5G to LTE or LTE-Advanced in 4G. In S5, the connection unit 33 connects the communicator 2 to the roaming network 1R. In this way, high-priority communication can be executed on the roaming network 1R with high communication quality.

In S6, the recording unit 34 in the communication device 2 records priority communication related information (the location of the communicator 2 during the priority communication, the time of the priority communication or other statistical information, the identification information of the roaming network 1R, the identification information of the priority communication partner etc.) regarding the priority communication executed on the roaming network 1R. In S7, the priority communication on the roaming network 1R finishes, and in S8, the communicator 2 reconnects to the home network 1H. If the communication device 2 is outside the service range of the home network 1H at the time of S7 (FIG. 2A), S8 shall be performed when the communication device 2 returns to the service range of the home network 1H. In S9, the notification unit 35 of the communication device 2 that has been reconnected to the home network 1H in S8 notifies the home network 1H of the priority communication related information recorded in S6. This notification from the communicator 2 is sent to the home network 1H as a message on the Access Stratum (AS) and/or Non-Access Stratum (NAS), which are functional layers in the Universal Mobile Telecommunications System (UMTS) protocol stack.

According to this embodiment, the recording unit 34 records the information about the priority communication executed in the roaming network 1R outside the home network 1H, and the notification unit 35 can notify the home network 1H. Therefore, the home network 1H can obtain sufficient information about priority communications such as emergency calls executed in the roaming network 1R. The priority communication related information shared to the home network 1H shall indicate that the communication quality of the roaming network 1R is better than that of the home network 1H in executing the priority communication. For this reason, the operator of the home network 1H can use the roaming network 1R as a benchmark by analyzing the priority communication related information notified by the notification unit 35, and identify locations and/or time periods where there is room for improvement in communication quality in the home network 1H relative to the roaming network 1R as a benchmark.

In addition, based on the priority communication related information notified by the notification unit 35, the operator of the home network 1H can recognize whether the roaming network 1R is available for priority communication in a specific location and/or time period. For example, the information that not only the home network 1H but also the roaming network 1R is not available at a certain location and/or time period is invaluable information for better network and/or business operations, which will be a trigger to expand the home network 1H and/or to strengthen alliance with a new roaming network 1R as a high-priority issue to be tackled as soon as possible.

The present disclosure has been described above based on embodiments. It is understood by those skilled in the art that the embodiments are exemplary and that various variations are possible in the combination of each component and each process thereof, and that such variations are also within the scope of the present disclosure.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure relates to wireless communication technology.

What is claimed is:

1. A wireless communication system comprising:

a priority communication detection unit that detects a priority communication from a communicator that communicates wirelessly;

a connection unit that selectively connects the communicator for which the priority communication is detected to any of a home wireless communication network or a roaming wireless communication network that is different from the home wireless communication network, wherein the connection unit connects the communicator to the roaming wireless communication network for the priority communication;

a recording unit in the communicator that records priority communication related information regarding the priority communication in the roaming wireless communication network during the priority communication in the roaming wireless communication network, wherein the recorded priority communication related information includes:

the start time of the priority communication in the roaming wireless communication network, the end time of the priority communication in the roaming wireless communication network, and the duration of the priority communication in the roaming wireless communication network; and a notification unit in the communicator that communicates the recorded priority communication related information regarding the priority communication in the roaming wireless network to the home wireless communication network after the priority communication ends on the roaming wireless communication network, wherein the communicator connects to the home wireless communication network after the priority communication ends on the roaming wireless communication network, wherein, after the communicator connects to the home wireless communication network after the priority communication ends on the roaming wireless communication network, the communicator communicates, to the home wireless communication network, the start time of the priority communication in the roaming wireless communication network, the end time of the priority communication in the roaming wireless communication network, and the duration of the priority communication in the roaming wireless communication network, and wherein:

the recorded priority communication related information includes identification information of another communicator with which the communicator executes the priority communication, and after the communicator connects to the home wireless communication network after the priority communication ends on the roaming wireless communication network:

the communicator communicates the identification information of another communicator with which the communicator executes the priority communication to the home wireless communication network.

2. The wireless communication system according to claim 1, further comprising a decision unit that determines whether or not a priority communication can be executed in the home wireless communication network, wherein the connection unit, when it is determined that the priority communication cannot be executed in the home wireless communication network, connects the communicator for which the priority communication is detected to the roaming wireless communication network.

3. The wireless communication system according to claim 1, further comprising a comparison unit for comparing the communication quality of the home wireless communication network and the roaming wireless communication network; and the connection unit connects the communicator for which the priority communication is detected to the roaming wireless communication network when the communication quality of the roaming wireless communication network is better than that of the home wireless communication network.

4. The wireless communication system according to claim 1, wherein at least one of the home wireless communication network and the roaming wireless communication network uses NR as a radio access technology.

5. The wireless communication system according to claim 1, wherein at least one of the home wireless communication network and the roaming wireless communication network uses 5GC as a core network.

6. The wireless communication system according to claim 1, wherein the priority communication includes a call to an emergency call number, and the information includes at least the emergency call number.

7. The wireless communication system according to claim 1, wherein the home wireless communication network is a wireless communication network with which the communicator is under contract, and wherein the roaming wireless communication network is different from the home wireless communication network with which the communicator is under contract.

8. The wireless communication system according to claim 1, wherein:

the recorded priority communication related information includes a location of the communicator during the priority communication, and after the communicator connects to the home wireless communication network after the priority communication ends on the roaming wireless communication network:

the communicator communicates the location of the communicator during the priority communication to the home wireless communication network.

9. The wireless communication system according to claim 1, wherein:

the recorded priority communication related information includes identification information of the roaming wireless communication network during the priority communication, and after the communicator connects to the home wireless communication network after the priority communication ends on the roaming wireless communication network:

the communicator communicates the identification information of the roaming wireless communication network to the home wireless communication network.

10. A wireless communication method comprising:

detecting a priority communication from a communicator that communicates wirelessly;

selectively connecting the communicator to any of a home wireless communication network or a roaming wireless communication network that is different from the home wireless communication network, the selectively connecting including connecting the communicator to the roaming wireless communication network for the priority communication;

recording, by the communicator, priority communication related information regarding the priority communication during the priority communication in the roaming wireless communication network, wherein the recorded priority communication related information includes:

the start time of the priority communication in the roaming wireless communication network, the end time of the priority communication in the roaming wireless communication network, and the duration of the priority communication in the roaming wireless communication network;

notifying, by the communicator, the recorded priority communication related information regarding the priority communication in the roaming wireless network to the home wireless communication network after the priority communication ends on the roaming wireless communication network;

connecting the communicator to the home wireless communication network after the priority communication ends on the roaming wireless communication network; and after connecting the communicator to the home wireless communication network after the priority communication ends on the roaming wireless communication network, communicating, by the communicator, to the home wireless communication network, the start time of the priority communication in the roaming wireless communication network, the end time of the priority communication in the roaming wireless communication network, and the duration of the priority communication in the roaming wireless communication network, wherein:

the recorded priority communication related information includes identification information of another communicator with which the communicator executes the priority communication, and the method further comprises, after connecting the communicator to the home wireless communication network after the priority communication ends on the roaming wireless communication network:

communicating, by the communicator, the identification information of another communicator with which the communicator executes the priority communication to the home wireless communication network.

11. A non-transitory computer-readable medium storing a wireless communication program that causes a computer to perform the method of claim 10.

12. The method according to claim 10, wherein the home wireless communication network is a wireless communication network with which the communicator is under contract, and wherein the roaming wireless communication network is different from the home wireless communication network with which the communicator is under contract.

13. The method according to claim 10, wherein:

the recorded priority communication related information includes a location of the communicator during the priority communication, and the method further comprises, after connecting the communicator to the home wireless communication network after the priority communication ends on the roaming wireless communication network:

communicating, by the communicator, the location of the communicator during the priority communication to the home wireless communication network.

14. The method according to claim 10, wherein:

the recorded priority communication related information includes identification information of the roaming wireless communication network during the priority communication, and the method further comprises, after connecting the communicator to the home wireless communication network after the priority communication ends on the roaming wireless communication network:

communicating, by the communicator, the identification information of the roaming wireless communication network to the home wireless communication network.

\* \* \* \* \*